United States Patent Office 3,186,540
Patented June 1, 1965

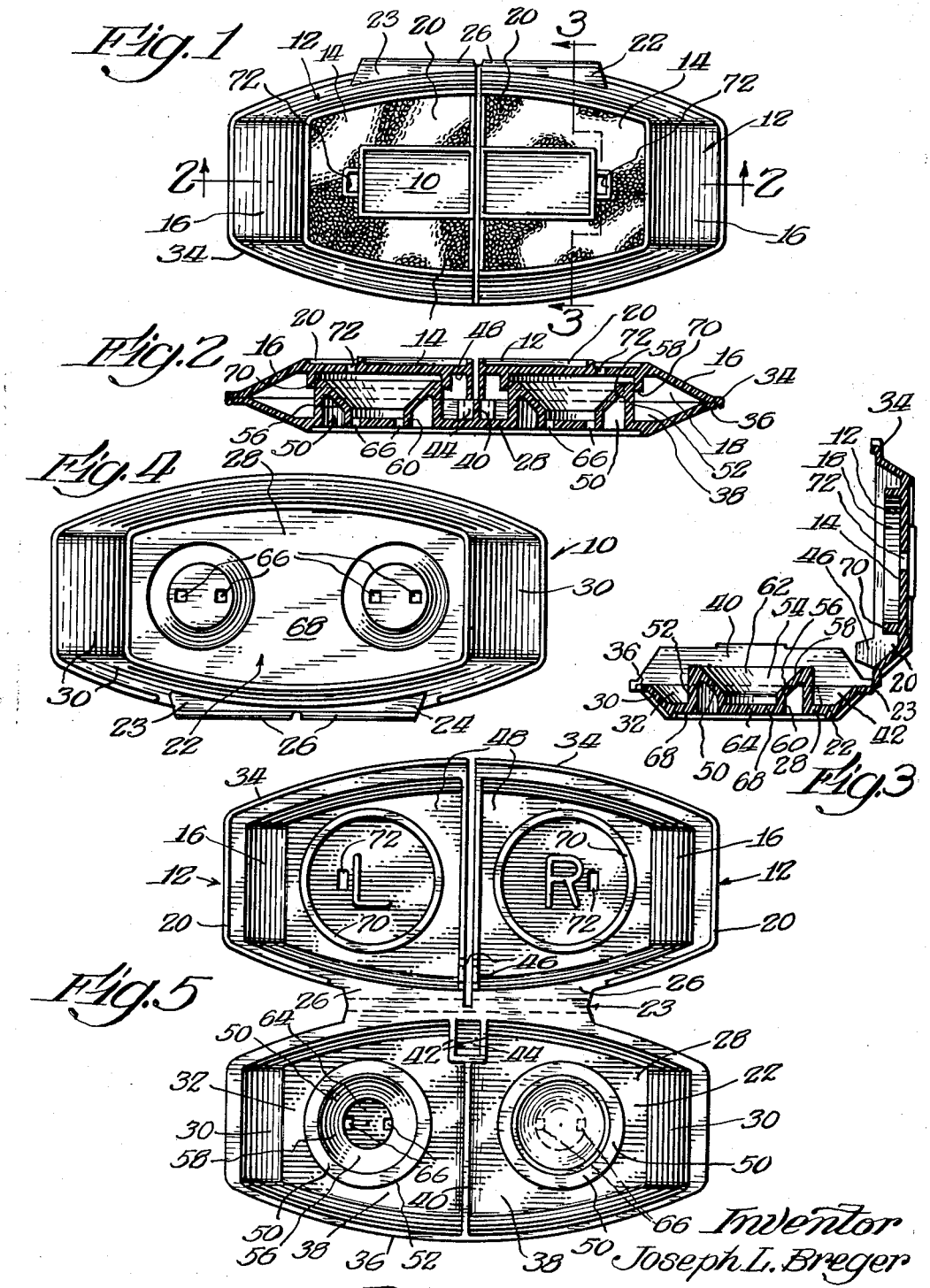

3,186,540
CONTACT LENS CONTAINER
Joseph L. Breger, 511 Ravine Drive, Highland Park, Ill.
Filed May 24, 1962, Ser. No. 197,468
5 Claims. (Cl. 206—5)

The present invention generally relates to contact lens containers and more particularly to improved contact lens carrying cases which provide increased safety against bacterial contamination.

Contact lens containers are generally of two types, "dry type" carrying cases and "wet type" soaking cases. The carrying cases hold the contact lens in confined spaces until ready for use. Soaking cases are used to soak the contact lenses in germicidal wetting solutions usually overnight. Soaking cases usually have means which positively seal them against liquid leakage, and also, incidentally seal the cases against access of air thereto.

Carrying cases for contact lens have no adequate means for circulation of air. The contact lens wearer removes the lenses from his eyes and while they are still wet with tears he places them in his carrying case, closing the lid thereon and sealing them in a closed confined space with no opportunity to dry out. Certain types of microorganisms multiply rapidly in a moist environment, particularly in the substantial absence of circulating air, such as in the usual carrying case holding two contact lens wet with tear fluids. Several of such microorganisms are potentially dangerous to the eye.

One of the dangerous microorganism is *Pseudomonas aeruginosa*, also known as pyocyaneus. Tests have shown that this microorganism is commonly found in the air, on human eye lids, and even in conventional wetting solutions which have been used too long and have become germicidally inactivated. This microorganism multiplies rapidly in the wet state and in the absence of air, and is known to be responsible for certain types of ulcers of the human cornea from which permanent damage or loss to the eye can result. This microorganism is incapable of penetrating intact corneal epithelium but can penetrate into the interior of the cornea through cracks in the epithelium. Inasmuch as it is relatively common to encounter abrasions and cracks of the corneal epithelium during normal wear of a contact lens, there is a substantial danger of penetration of the cornea in the abraded areas by this microorganism.

A second microorganism commonly present in the environment and capable of multiplying under moist conditions is *Staphylococcus aureus*. This microorganism can also cause considerable corneal damage. Bactericidal contact lens soaking solutions readily become inactivated so as to be incapable of eliminating such dangerous microorganisms from contact lenses. Accordingly, it will be understood that there is a certain real hazard in allowing contact lenses to be stored or carried any length of time in a moist condition.

The foregoing problems connected with air tight containers and carrying cases have now been overcome. A small, compact, neat dry type contact lens case is provided which is capable of effectively storing contact lenses in a dry condition which minimizes danger of microbial contamination thereof. When it is desired to use the contact lenses so stored, they can be removed dry from the contact lens carrying case of the present invention, dipped into a germicidal wetting solution then placed on the eyes. Since they are stored dry, they are substantially free of bacteria and any few remaining bacteria can be readily inactivated by the germicidal wetting solution. If the contact lenses were stored for any length of time in a moist condition, they would have greatly increased concentrations of bacteria, in many instances too large in number to be inactivated by short-term contact with a wetting solution.

Accordingly, it is the principal object of the present invention to provide improved means for the containment of contact lenses. It is also an object of the present invention to provide an improved small contact lens carrying case or container. It is a further object of the present invention to provide a contact lens case constructed to maintain contact lenses in a more sanitary condition. Further objects and advantages of the present invention will be apparent from a study of the following detailed description and from the accompanying drawings of which:

FIGURE 1 is a top plan view of a preferred embodiment of the dry contact lens case of the present invention, with the cover closed;

FIGURE 2 is a section taken along the section line 2—2 of FIGURE 1;

FIGURE 3 is a section taken along the section line 3—3 of FIGURE 1;

FIGURE 4 is a bottom plan view of the embodiment of FIGURE 1; and

FIGURE 5 is a top plan view of the embodiment of FIGURE 1 with the cover fully opened to show the internal construction of said case.

The present invention generally comprises an improved air circulating contact lens case. More particularly, the dry case is constructed to firmly hold corneal or other types of contact lenses in place, in individual compartments therein, with both surfaces of each contact lens fully exposed to circulating air, in order to inactivate potentially dangerous microorganisms normally present on the surfaces of the contact lenses, case, etc. The contact lens case is small, compact, durable and inexpensive, and affords a maximum of convenience and safety for the contact lens wearer.

Now referring more particularly to the accompanying drawings, a preferred embodiment of the dry type contact lens case of the present invention is illustrated in top plan view in FIGURE 1 of the accompanying drawings. In FIGURE 1, a contact lens case 10 is shown with the cover 12 thereof in a closed position. The contact lens case may be of any suitable size and shape, for example generally oval with truncated ends, as shown in FIGURE 1. The case may be fabricated of any suitable inert durable and preferably inexpensive material, such as plastic, wood, metal, glass or other ceramic fabric and the like or a suitable combination of such materials. One particularly suitable material is relatively inexpensive plastic resin, such as polypropylene, which can be boiled in water, for example, 20 minutes or so to sterilize the same, without adversely affecting the plastic.

The cover 12 of the contact lens case 10 is preferably in the form of a top wall 14 connected to the margins thereof to downwardly and outward sloping sidewalls 16 so that the cover 12 defines a cavity 18. The cover 12 is preferably split into two separate spaced apart lids 20, providing separate access to individually stored contact lenses, as described more fully hereinafter.

The cover 12 is interconnected with an open-topped base 22 of generally similar configuration (as shown in FIGURE 4, to that of the cover 12) as by a hinged portion 23, which also may be split into two sections 26 to facilitate separate opening of the lids 20.

The base 22 is preferably slightly smaller in diameter than the cover 12 and has a bottom wall 28 and upwardly and outwardly extending sidewalls 30 defining a cavity 32. Cover 12 has a rim 34 which depends from the periphery of sidewalls 16, except in the area of the hinged portion, which rim is adapted to releasably and frictionally engage a corresponding bead 36 on the periphery of sidewalls 30 of the base 22. The base is preferably divided, as shown more particularly in FIGURE 5 of the accompanying drawings into two separate compartments 38 by means of a partition 40. Each compartment 38 is constructed to store one contact lens. The partition 40 may be split adjacent one end into two opposed spaced L-shaped walls 42 as shown in FIGURE 5 defining a recess 44 dimensioned to receive guide tabs 46 depending from the inner surface 48 of adjacent portions of the two lids 30 when the lids are closed down upon the base 22. Accordingly, proper alignment of lids 20 with respect to the base 22 during the closing operation is facilitated.

In each compartment 38 there is provided a raised generally cylindrical receptacle 50 having a generally vertical cylindrical outer wall 52. The receptacle 50 is provided with a cavity 54 defined by an inner wall 56, the upper portion 58 of which is frusto-conical and joined to the outer wall 52 at the upper end thereof, and the lower portion 60 of which is narrowed to a generally vertical neck. The upper portion of the cavity generally conforms to the convex surface of a contact lens and is adapted to receive and support the same. The bottom of the receptacle 50 is provided with a closed horizontal floor 64, connected at the periphery to the lower end of the lower necked portion 60. The floor 64 has at least one and preferably a plurality of air holes or passageways 66 extending therethrough, as shown in FIGURE 4. Also, as shown more particularly in FIGURES 3 and 4 of the accompanying drawings, the floor 64 of each receptacle 50 is spaced upwardly from the bottom surface 68 of the remainder of the bottom wall 28 of the base 22 to facilitate circulation of air to and from the cavity 54 through the air holes 66 in the floor 64 and thus into contact with the convex surface of a contact lens supported in the upper portion 62 of the cavity 54.

Each lid 20 is provided on the inner surface 48 thereof with, as shown in FIGURE 5, retaining means in the form of a depending rim 70 dimensioned to abut the periphery of the upper portion of outer wall 52 of associated receptacles 50 when the lid is in a closed position, as shown in FIGURE 2 to form with the receptacle 50 an enclosed chamber. The rim 70 prevents displacement of a contact lens from the receptacle cavity 54 during movement of the case 10.

Cover 12 is provided with air holes 72 affording direct and free access of air into contact with the concave surface of each contact lens when the lenses are stored in their receptacles within case 10. For example, at least one hole 72 is preferably provided, as shown in FIGURE 2 in each lid 20 directly over (when the lid is closed) the corresponding receptacle 50 in base 22.

It will be readily understood that additional air holes may be provided in the cover 12 and base 22 of the case 10, as desired. In any event, air holes must be provided in accordance with the present invention which afford easy, direct and free access of air into direct contact with both surfaces of each contact lens when the case is closed, as shown in FIGURE 2. This feature assures maintenance of the contact lenses in the case 10 in a dry sanitary condition, utilizing air and absence of moisture as sanitizing means to inactivate and/or destroy potentially dangerous microorganisms which may be present on the surfaces of the contact lenses, case, etc.

In fabricating the contact lens case of the present invention, it is preferred that, particularly where plastic is utilized, the case be fabricated in one piece by a single forming operation. This reduces the overall cost of the case and substantially eliminates assembling operations. The case is constructed so that the hinged portion of the case can be made integral with both the cover and base. So also can the receptacles, rims, partition and other components of the base and cover. In so fabricating the contact lens case a conventional plastic molding operation utilizing conventional thermo-setting plastic resin and suitably shaped dies can be employed. Alternatively, one or more components of the contact lens case of the present invention, as for example, the mating hinge components, can be constructed separately and the components can thereupon be assembled together. In this connection, the cover can be formed separately from the base and interconnected therewith by conventional pin and hinge means (not shown). Moreover, if desired, any one or more of the rims, receptacles, receptacle floors, partition, etc., can be formed separately and then assembled with the remaining components of the case by any suitable means, as by bonding agents, etc.

The described dry type contact lens case of the present invention is relatively inexpensive, simple, compact, small and sanitary. In the latter respect, it is effective in preventing the multiplication of certain microorganisms on the surfaces of contact lenses while they are stored in the case. Moreover, the case is constructed so that each contact lens is individually compartmented and securely held in position in the case, and can be readily inserted into and removed from the case.

Various of the features of the present invention are set forth in the appended claims.

What is claimed is:

1. An improved ventilated dry-type contact lens case comprising a base portion divided into a pair of compartments, each of said compartments including a contact lens-retaining means having a raised generally cylindrical receptacle connected to said base, a cavity within said receptacle defined by an inverted generally frusto-conical annular surface of the upper portion of said receptacle and by a generally cylindrical lower portion, a floor positioned in said lower portion, said floor also defining a portion of the outer wall of said base, said cavity being adapted to receive a contact lens with the convex surface of the lens resting upon the frusto-conical surface of the cavity and above the said floor, said floor of said cavity being provided with an aperture extending from the cavity to the atmosphere outside the case so as to provide communication between the convex surface of the lens and the atmosphere, and a cover hingedly interconnected with said base.

2. An improved ventilated dry-type contact lens case comprising a base portion having a partition dividing it into a pair of compartments, each of said compartments including a contact lens-retaining means having a raised generally cylindrical receptacle connected to said base, a cavity within said receptacle defined by an inverted generally frusto-conical surface of the upper portion of said receptacle and by a generally cylindrical lower portion, a floor positioned in said lower portion, said floor also defining a portion of the outer wall of said base, said cavity being adapted to receive a contact lens with the convex surface of the lens resting upon the frusto-conical surface of the cavity and above the said floor, said floor of said cavity being provided with an aperture extending from the cavity to the atmosphere outside the case so as to provide communication between the convex surface of the lens and the atmosphere, and a cover hingedly interconnected with said base, said cover being provided with an aperture located in those portions thereof which overlie each of said receptacles so as to provide communication between the concave surfaces of contact lenses disposed in the receptacles and the atmosphere.

3. The contact lens case in accordance with claim 2 wherein said cover comprises two separate hinged lids corresponding to said compartments of said base.

4. The contact lens case in accordance with claim 3 wherein the hinge interconnecting said cover and said base comprises a bendable portion integral with both said cover and said base, whereby said case is a single unitary structure.

5. The contact lens case in accordance with claim 3 wherein the hinge interconnecting said cover and said base comprises a bendable portion integral with both said cover and said base, and wherein said partition and said receptacles are integral with said base, whereby said case is a single unitary structure.

References Cited by the Examiner

UNITED STATES PATENTS

| | | | |
|---|---|---|---|
| 1,780,264 | 11/30 | Koppelman | 229—29 |
| 2,271,156 | 1/42 | Walker | 220—10 |
| 2,560,847 | 7/51 | Chaplin | 229—29 |
| 2,971,685 | 2/61 | Treida | 229—29 |
| 3,037,616 | 6/62 | Phipps | 206—5 |
| 3,089,500 | 5/63 | Stalcup | 206—5 |
| 3,115,146 | 12/63 | Erwin | 206—5 |

THERON E. CONDON, *Primary Examiner.*

EARLE J. DRUMMOND, *Examiner.*